Figure 1:
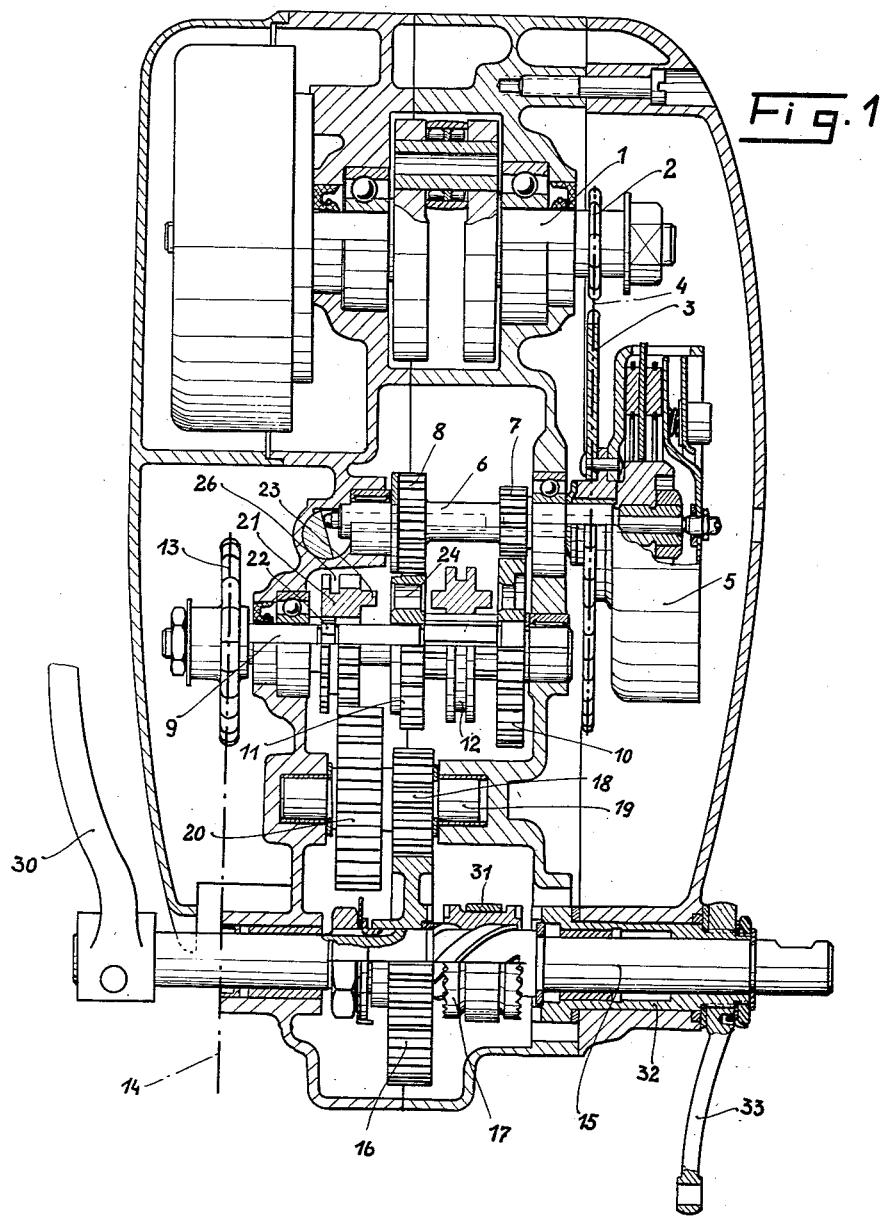

Aug. 28, 1956 — A. FUCHS — 2,760,385
DRIVE ARRANGEMENT, PARTICULARLY FOR MOTORCYCLES
Filed June 1, 1955 — 2 Sheets-Sheet 2

United States Patent Office 2,760,385
Patented Aug. 28, 1956

2,760,385

DRIVE ARRANGEMENT, PARTICULARLY FOR MOTORCYCLES

Anton Fuchs, Hallein, Austria, assignor, by mesne assignments, to Halleiner Motorenwerke Hinterberger, Schreitt & Co., Hallein, Austria Application June 1, 1955, Serial No. 512,440

Claims priority, application Austria October 30, 1954

5 Claims. (Cl. 74—625)

This invention relates to a drive arrangement comprising a gear unit input shaft mounting at least two toothed gear unit wheels for rotation therewith, a gear unit output shaft carrying at least two toothed gear unit wheels rotatably arranged thereon, each of said gear unit wheels on said output shaft being in mesh with one of said gear unit wheels on said input shaft, means operable to couple selectively one of said gear unit wheels on said output shaft for rotation with the latter, a second input shaft, and an additional gear wheel arranged on said gear unit output shaft and adapted to be driven by said second input shaft.

In lightweight motorcycles which comprise a crankshaft, a clutch normally operatively connecting and operable to disconnect said crankshaft and gear unit input shaft, an output sprocket fast on said output shaft, and a pedal shaft constituting said second input shaft such gear arrangements enable the starting of the engine with the aid of the pedals without or with a simultaneous drive of the rear wheel, and enable pedal operation while the engine is running or for an exclusive pedal drive of the vehicle. In the previously known drive arrangements of that type the additional gear wheel arranged on the output shaft and adapted to be driven by the second input shaft is firmly connected to one of the gear unit wheels so that the disadvantage results that even in the case of an exclusive pedal drive all gear unit wheels as far as to the engine clutch must be moved too. This means that the transmission of power from the pedal shaft to the engine crankshaft can be interrupted only by an actuation of the engine clutch and the exclusive pedal drive is relatively heavy owing to the power losses due to friction.

It is an object of the invention to provide a drive arrangement of the type described which is adapted to transmit power from the second input shaft to the gear unit output shaft without transmitting power from the second input shaft to the gear unit wheels.

It is another object of the invention to provide a drive arrangement of the type described which is adapted to transmit power from the second input shaft directly to the output shaft independently of the selection of the gear unit wheel which is coupled to the output shaft to transmit torque thereto from the gear unit input shaft.

It is another object of the invention to provide a drive arrangement for lightweight motorcycles of the type described, in which an exclusive pedal drive is possible without actuation of the engine clutch.

With these and other objects in mind, which will become apparent as the specification proceeds, the invention provides means for selectively coupling said additional gear wheel on the output shaft either directly to one of said gear unit wheels on said output shaft or for uncoupling said additional gear wheel from said last-mentioned gear unit wheel and for coupling it directly to said output shaft.

Thus it is possible to establish either a direct transmission of power from the pedal shaft to the gear unit output shaft and thus to the drive chain sprocket—in this case the transmission of power through the gear unit to the engine clutch is inherently interrupted and the latter need not be actuated—or said additional gear wheel on the gear unit output shaft may be coupled to the adjacent gear unit wheel to establish the usual, previously uninterruptible connection for starting the engine. In the former case an exclusive pedal drive results, as in a bicycle, without need for moving the toothed wheel change gear unit and one half of the engine clutch. Another advantage of the drive arrangement according to the invention resides in the fact that pedal operation with a direct transmission of power, i. e. without transmission through the gear unit wheels, is possible while the engine is running regardless what speed has been selected in the gear unit.

A particularly simple and appropriate construction is achieved in accordance with a development of the invention if the additional gear wheel on the output shaft constitutes itself a shiftable clutch member, which will leave the output shaft portion intended for rotating the wheel if the latter is shifted to the adjacent gear unit wheel. To minimize its width that gear wheel may comprise a groove which interrupts its teeth and is engageable by a shifting fork.

Figure 2:
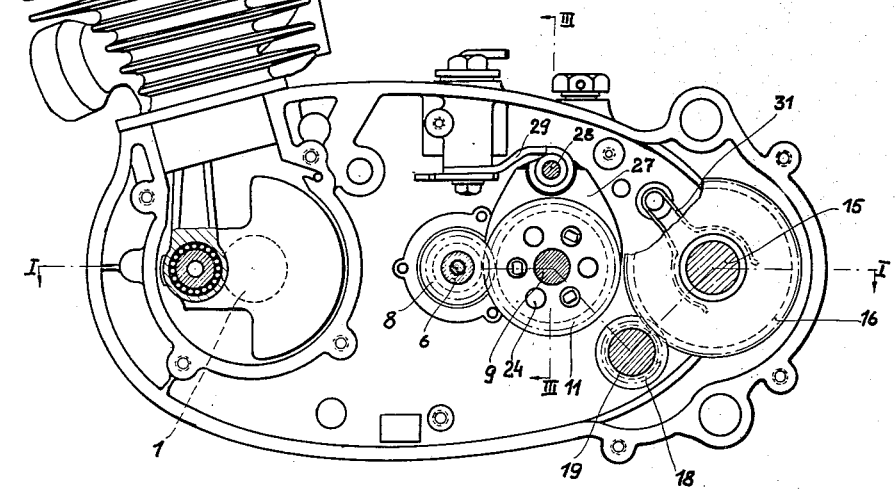
Figure 3:
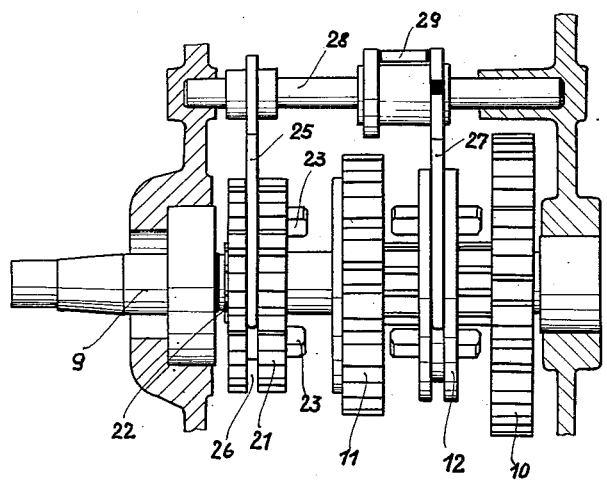

An illustrative embodiment of the invention is shown in the accompanying drawing, in which Fig. 1 is a diagrammatic sectional view taken on line I—I of Fig. 2 and showing the entire drive arrangement of a lightweight motorcycle, Fig. 2 is a partly sectional side view showing on a reduced scale the unit comprising the engine and the gear unit, the gear casing portion shown on the left in Fig. 1 being removed, and Fig. 3 is a sectional view taken on line III—III of Fig. 2 and showing a detail on an enlarged scale.

1 designates an engine crankshaft, which drives a gear unit input shaft 6 through sprocket wheels 2, 3, chain 4 and an engine clutch 5, which in the usual manner normally operatively connects and is operable to disconnect the crankshaft 1 and the input shaft 6. Obviously the sprockets may be replaced by intermeshing gear wheels. The gear unit input shaft 6 carries two gear wheels 7, 8, which are in permanent mesh with two gear wheels 10, 11 freely rotatably carried on a gear unit output shaft 9. The gear wheels 10, 11 can be selectively coupled to the output shaft 9 by a claw-type shifting sleeve 12, which is shiftable between them. The output shaft carries an output sprocket 13 for a single drive chain 14 extending to a rear wheel. A common casing of the engine and gear unit mounts also a second input or pedal shaft 15, which carries a first gear wheel 16 freely rotatable thereon. The gear wheel 16 can be coupled to the pedal shaft with the aid of a thread-type claw clutch 17 arranged on the pedal shaft 15. The gear wheel 16 meshes with a second gear wheel 18, which is coupled to a third gear wheel 20 on an intermediate shaft 19. The gear wheel 20 is in permanent mesh with an additional gear wheel 21 shiftable on the output shaft 9. Thus the gear wheel 21 is adapted to be driven by the second input shaft 15 through the clutch 17 and gear wheels 16, 18 and 20.

Means are provided for selectively coupling the gear wheel 21 either directly to the gear unit wheel 11 on the output shaft 9 or for uncoupling the gear wheel 21 from the gear unit wheel 11 and for coupling it directly to the output shaft 9. To this end the gear wheel 21 is shiftable on the output shaft 9 between first and second positions and the output shaft 9 is formed with a wheel coupling portion 22 arranged to cooperate with the gear wheel 21 only in the first position thereof to couple the gear wheel 21 directly to the output shaft 9; moreover, the gear wheel 21 and the gear unit wheel 11 are formed with coupling means adapted to interengage only in the second position of the gear wheel 21 for coupling the latter directly to the gear unit wheel 11. These coupling means comprise claws 23 on the gear wheel 21 and corresponding openings 24 in the gear unit wheel 11. The gear wheel 21 is formed with a peripheral rim of teeth in mesh with the third gear wheel 20 in both positions of the gear wheel 21. That rim is interrupted by an annular groove 26, which is engageable by a shifting fork 25 for shifting the gear wheel 21. Another shifting fork 27 is provided for shifting the claw-type shifting sleeve 12. Both shifting forks 25 and 27 are slidably carried on a common shaft 28 and are adjustable from the outside by means of rocker levers 29 acting thereon.

To move the vehicle only by pedal operation—only one pedal 30 is indicated in the drawing—the first position, shown in Fig. 1, must be provided. As the pedals are turned forwardly the thread-type claw sleeve 17, which is prevented from rotating by a brake spring 31, shifts towards the gear wheel 16 and couples the same to the pedal shaft 15. Power is then transmitted from the pedal shaft 15 through the gear wheels 16, 18, 20, 21 directly to the output shaft 9 and the output shaft sprocket 13 and from the latter through the chain 14 to the rear wheel. Since the gear unit wheels 10, 11 are rotatably carried on the output shaft 9 and the claw-type shifting sleeve 12 is in its intermediate position the pedal operation will not cause a movement of the gear unit wheels and an actuation of the engine clutch 5 is not necessary. To start the engine while the rear wheel is stationary it is sufficient to shift the gear wheel 21 to its second position so as to couple it to the gear unit wheel 11 whereas the claw-type shifting sleeve remains in its no-load position. In that case power is transmitted from the pedal shaft 15 through the gear wheels 16, 18, 20, 21 and the gear unit wheel 11 to the input shaft 6 and finally through the clutch 5, the chain sprockets 3, 2 to the engine crankshaft 1. The transmission ratio from the pedal shaft to the engine crankshaft may be selected to be as favorable as with a separate starting pedal (kick starter).

If the first position according to Fig. 1 is retained and only the claw-type shifting sleeve 12 is caused to engage the gear wheel 11, whereby the change gear unit is shifted to its first speed, the running engine can be assisted uphill by pedal operation in a favorable torque and speed range. The engine can be started also while the vehicle is being moved by pedal operation. To this end the claw-type shifting sleeve is coupled to the gear unit 11 for the second speed of the gear unit. The thread-type claw clutch 17 will prevent an unintended rotation of the pedals.

It would also be possible to provide for the shiftable gear wheel 21 on the output shaft 9 a no-load position, in which it is neither connected for rotation with the output shaft nor coupled to the gear unit wheel 11. Thus it would be achieved that in the case of an exclusive engine drive the wheels 21, 20, 18 and 16 do not rotate and no power losses are caused by the movement of these partly large gear wheels in the oil sump.

If the pedals are operated in the reverse direction the thread-type claw clutch 17 will be shifted to the right and will couple a sleeve 32 to the pedal shaft 15. That sleeve 32 is connected to a lever 33, which engages the linkage of a rear wheel brake so that a braking ensues in the usual manner upon reverse pedalling.

I claim:

1. In a drive arrangement comprising a gear unit input shaft mounting at least two toothed gear unit wheels for rotation therewith, a gear unit output shaft carrying at least two toothed gear unit wheels rotatably arranged thereon, each of said gear unit wheels on said output shaft being in mesh with one of said gear unit wheels on said input shaft, means operable to couple selectively one of said gear unit wheels on said output shaft for rotation with the latter, a second input shaft, and an additional gear wheel arranged on said gear unit output shaft and adapted to be driven by said second input shaft, the provision of means for selectively coupling said additional gear wheel on the output shaft either directly to one of said gear unit wheels on said output shaft or for uncoupling said additional gear wheel from said last-mentioned gear unit wheel and for coupling it directly to said output shaft.

2. In a drive arrangement comprising a gear unit input shaft mounting at least two toothed gear unit wheels for rotation therewith, a gear unit output shaft carrying at least two toothed gear unit wheels rotatably arranged thereon, each of said gear unit wheels on said output shaft being in mesh with one of said gear unit wheels on said input shaft, means operable to couple selectively one of said gear unit wheels on said output shaft for rotation with the latter, and a second input shaft, the combination of an additional gear wheel arranged on said gear unit output shaft and shiftable thereon between first and second positions, means arranged directly to couple said additional gear wheel only in said first position to said output shaft, and means arranged to couple said additional gear wheel only in said second position directly to one of said gear unit wheels on said output shaft, said additional gear wheel being adapted to be driven by said second input shaft in both said positions.

3. In a drive arrangement comprising a gear unit input shaft mounting at least two toothed gear unit wheels for rotation therewith, a gear unit output shaft carrying at least two toothed gear unit wheels rotatably arranged thereon, each of said gear unit wheels on said output shaft being in mesh with one of said gear unit wheels on said input shaft, means operable to couple selectively one of said gear unit wheels on said output shaft for rotation with the latter, and a second input shaft, the combination of an additional gear wheel arranged on said gear unit output shaft and shiftable between first and second positions, and a wheel coupling portion forming part of said output shaft and arranged to cooperate with said additional gear wheel only in the first position thereof to couple said additional gear wheel directly to said output shaft, said additional gear wheel and one of said gear unit wheels on said output shaft being formed with coupling means adapted to interengage only in the second position of said additional gear wheel for coupling the latter directly to the last-mentioned gear unit wheel, said additional gear wheel being adapted to be driven by said second input shaft in both said positions.

4. In a drive arrangement comprising a gear unit input shaft mounting at least two toothed gear unit wheels for rotation therewith, a gear unit output shaft carrying at least two toothed gear unit wheels rotatably arranged thereon, each of said gear unit wheels on said output shaft being in mesh with one of said gear unit wheels on said input shaft, means operable to couple selectively one of said gear unit wheels on said output shaft for rotation with the latter, a second input shaft carrying a first gear wheel rotatable thereby, an intermediate shaft carrying a second gear wheel in mesh with said first one, and a third gear wheel coupled to said second one, the combination of an additional gear wheel arranged on said gear unit output shaft and shiftable thereon between first and second positions, means arranged directly to couple said additional gear wheel only in said first position to said output shaft, and means arranged to couple said additional gear wheel only in said second position directly to one of said gear wheels on said output shaft, said additional gear wheel being formed with a peripheral rim of teeth in mesh with said third gear wheel in both said positions and interrupted by an annular groove, and a shifting fork being provided for engaging said groove and operable to shift said additional gear wheel between said first and second positions.

5. A drive arrangement for a lightweight motorcycle, comprising, in combination a crankshaft, a gear unit input shaft mounting at least two toothed gear unit wheels for rotation therewith, a clutch normally operatively connecting and operable to disconnect said two shafts, a gear unit output shaft carrying at least two toothed gear unit wheels rotatably arranged thereon, each of said gear unit wheels on said output shaft being in mesh with one of said gear unit wheels on said input shaft, an output sprocket fast on said output shaft, means operable to couple selectively one of said gear unit wheels on said output shaft for rotation with the latter, a pedal shaft, an additional gear wheel arranged on said gear unit output shaft and adapted to be driven by said pedal shaft, and means for selectively coupling said additional gear wheel on the output shaft either directly to one of said gear unit wheels on said output shaft or for uncoupling said additional gear wheel from said last-mentioned gear unit wheel and for coupling it directly to said output shaft.

No references cited.